Jan. 16, 1962  F. W. LINDBLOM  3,016,542
GOGGLE WITH LIFTING COVER
Filed Dec. 28, 1959
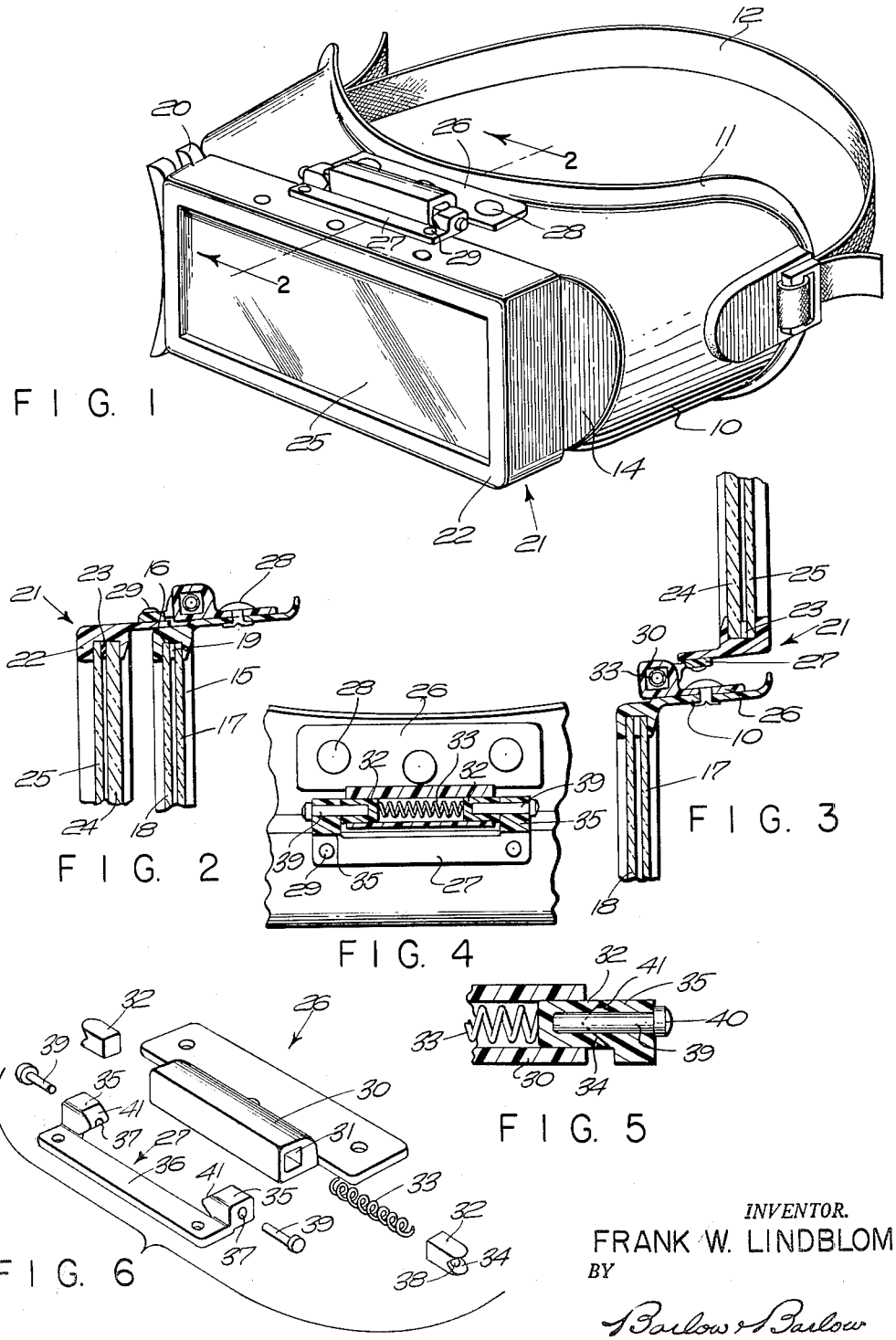
INVENTOR.
FRANK W. LINDBLOM
BY
Barlow & Barlow
ATTORNEYS

United States Patent Office 3,016,542
Patented Jan. 16, 1962

3,016,542
GOGGLE WITH LIFTING COVER
Frank W. Lindblom, Warwick, R.I., assignor to Welsh Manufacturing Company, a corporation of Rhode Island
Filed Dec. 28, 1959, Ser. No. 862,296
1 Claim. (Cl. 2—14)

This invention relates to a goggle of the type used by welders for protecting the eyes while engaged in welding.

In a welder's goggle in addition to there being provided some sort of a window shield for protecting the eyes from flying particles, a light controlling means is provided so that the bright light from the welding operation will not be harmful to the eyes. When the welding operation is stopped, the light-reducing part of the goggle is no longer desired.

One of the objects of this invention is to provide an arrangement so that when the welding operation is stopped, without removing the goggle from the head the light retarding portion of the goggle may be removed from the line of vision so that normal vision through an undarkened lens may be had.

Another object of the invention is to provide an easy manner of temporarily removing the light obstructing portion of the goggle.

A further object of the invention is to provide for the removing of the light obstructing portion of the goggle by swinging a cover containing the light obstructing portion from the line of vision to a point above the line of vision and causing the same to remain there until moved back into covering position.

Another object of the invention is to provide a positive means for holding the cover in the selected position to which it has been moved whether it be in covering position or in uncovering position.

Another object of the invention is to provide a means for holding the covering frame in a selected position by a construction which will be itself well protected and one which is compact and effective.

With these and other objects in view, the invention consists of certain novel features of construction as will be more fully described and particularly pointed out in the appended claim.

In the accompanying drawings:

FIGURE 1 is a perspective view of the goggle equipped with this invention;

FIGURE 2 is a section on line 2—2 of FIGURE 1 of a fragmental portion of the goggle;

FIGURE 3 is a view similar to FIGURE 2 but illustrating the covering frame as moved from covering position to raised position;

FIGURE 4 is a plan view of a fragmental portion of the goggle with the hinge portion in section;

FIGURE 5 is an enlarged sectional view of one end of the hinge; and

FIGURE 6 is a perspective exploded view of the various parts of the hinge.

In proceeding with this invention, the body of the goggle which has a sight lens is provided with a frame carrying a lens which controls the bright electric arc light so as to reduce its intensity on the eyes and I have hinged this frame on the upper portion of the body of the goggle above the sight lens, the hinge being arranged with resilient means having such interfitting relation between its parts that the frame may be positively held in covering position over the lens or may be swung to a position uncovering the lens and there positively held.

With reference to the drawings 10 designates the body part of the goggle which is so shaped that it will receive the nose and cover the eye, there being a flange 11 of flexible character so that the body may snugly engage the face about the eyes and be held thereto. An elastic strap 12 holds this body part in position on the face. The front portion 14 of the body is provided with a window opening 15 and about this opening there is a channel or groove 16 in which there is located one or more lenses 17 and 18. These lenses may be inserted by means of a carrier 19 having an end portion 20 as described in my co-pending application, Serial No. 668,524, filed June 27, 1957, now Patent No. 2,923,944, granted February 9, 1960. In the present instance either the lenses 17 or 18 or both of them will be clear lenses.

A cover designated generally 21 is provided to cover the lenses 17 and 18 and comprises a frame 22 in which there may be provided a carrier 23 similar to the carrier 19 and which contains lenses 24 and 25. The lens 24 will be provided with some light retarding material so as to dim the light materially in the line of vision of the wearer of the goggle. The other lens 25 will serve as a protection therefor.

It may be desirable to remove this light dimming lens from the line of sight, and in order to do so, I have arranged for swinging the frame 21 from the position shown in FIGURES 1 and 2 to the position shown in FIGURE 3 which will be out of the line of sight of the wearer of the goggle. The body portion 10 is provided with a member 26 and the frame 21 is provided with a member 27 as may be seen in FIGURE 6 which members 26, 27 are hinged together on a common axis as will be hereinafter apparent. The member 26 is secured to the top of the body portion 10 by any suitable means such as by rivets 28 and the member 27 is similarly secured to the frame 21 by rivets 29.

The member 26 is provided with a tubular center portion 30 which has a rectangular bore 31 extending therethrough. In each end of the rectangular bore 31, there is a rectangular part 32 slidably located and a spring 33 acting between these two parts forces them outwardly of the tube. In each of these parts 32 the outer end is notched at at 34 in a V-shape.

The other member 27 has parts 35 at either end which are connected together by the bridging portion 36. The parts 35 are spaced sufficiently so that they will straddle the tube 30 and align with the parts 32. A hole 37 extends axially through the parts 35 and a hole 38 extends axially into the parts 32. Pins 39 extend through the holes 37 and into the holes 38 and are headed as at 40 there being a sufficiently tight fit in one of these holes 37, so that they will not move outwardly, thus pivotally mounting the member 27 with reference to the member 26.

The inner ends of each of the parts 35 are V-shaped as at 41 so as to lodge within the V-shaped recess 34 and thus the parts 26 and 27 will be held either in the relationship shown in FIGURE 2 or the relationship shown in FIGURE 3, which represents a movement through substantially 180 degrees, causing the V-shaped portions 41 to lodge in the V-shaped notches 34 in either one of these two positions 180 degrees apart.

From the foregoing it will be apparent that when the welder is finished welding and he desires to remove the light retarding cover in front of the lenses 17 or 18, he may merely take hold of the frame 21 and swing it from the covering position shown in FIGURE 2 to the raised position shown in FIGURE 3, and the cover frame will stay in the raised position due to the hinge mechanism which has been provided.

I claim:

A goggle comprising a body portion with a window opening and a lens closing said opening, a cover for said lens comprising a frame mounting a transparent shield, hinge means above said window opening for hinging said frame to said body portion for swinging the frame from lens covering position to a position out of the line of sight through said lens, said hinge means comprises a member secured to said frame and a member secured to said body portion, said members being relatively movable about a common axis, one of said members having a tube of out of round cross-section, plunger parts of corresponding out of round cross-section slidable in each end of said tube, a spring urging said parts outwardly, said other member having cooperating parts in position to be engaged by said plunger parts, each pair of cooperating parts having one part with a V projection and the other part with a V recess whereby said members may be rotated through 180° from one interlocking relation to the other.

References Cited in the file of this patent

UNITED STATES PATENTS

| | | |
|---|---|---|
| 294,746 | Straup | Mar. 4, 1884 |
| 769,035 | Walter | Aug. 30, 1904 |
| 2,270,238 | Clarke et al. | Jan. 20, 1942 |

FOREIGN PATENTS

| | | |
|---|---|---|
| 702,186 | France | Jan. 19, 1931 |
| 201,777 | Austria | Jan. 26, 1959 |